(12) United States Patent
Bennett, Jr.

(10) Patent No.: US 9,210,267 B2
(45) Date of Patent: *Dec. 8, 2015

(54) SYSTEM AND METHOD FOR ACCESSING A CONFERENCE SYSTEM

(71) Applicant: TELEFONAKTIEBOLAGET L M ERICSSON (PUBL), Stockholm (SE)

(72) Inventor: Reed Bennett, Jr., Allen, TX (US)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 14/568,735

(22) Filed: Dec. 12, 2014

(65) Prior Publication Data

US 2015/0099499 A1 Apr. 9, 2015

Related U.S. Application Data

(63) Continuation of application No. 13/705,337, filed on Dec. 5, 2012, now Pat. No. 8,914,006.

(51) Int. Cl.

| | |
|---|---|
| *H04M 3/42* | (2006.01) |
| *H04M 3/56* | (2006.01) |
| *H04W 4/06* | (2009.01) |
| *H04L 12/18* | (2006.01) |
| *H04W 4/16* | (2009.01) |

(52) U.S. Cl.
CPC ............ *H04M 3/56* (2013.01); *H04L 12/1818* (2013.01); *H04M 3/565* (2013.01); *H04M 3/567* (2013.01); *H04W 4/06* (2013.01); *H04W 4/16* (2013.01); *H04M 2203/5054* (2013.01)

(58) Field of Classification Search
CPC ....... H04M 3/56; H04M 3/567; H04M 3/565; H04M 2203/5054; H04W 4/16; H04W 4/06
USPC .............................. 455/416, 414.1, 418, 419
See application file for complete search history.

(56) References Cited

U.S. PATENT DOCUMENTS

| | | | |
|---|---|---|---|
| 8,914,006 B2 * | 12/2014 | Bennett, Jr. ................... | 455/416 |
| 2004/0203977 A1 | 10/2004 | Kennedy | |
| 2005/0227680 A1 * | 10/2005 | Snowden ....................... | 455/416 |
| 2008/0074488 A1 | 3/2008 | Thompson | |
| 2010/0189244 A1 | 7/2010 | Sastry | |

(Continued)

FOREIGN PATENT DOCUMENTS

WO WO 2005/104512 A1 11/2005

*Primary Examiner* — Khai M Nguyen

(57) ABSTRACT

A user equipment, method, non-transitory computer-readable storage medium, a system of connecting a user equipment to a conference system are provided. According to an embodiment of the present invention, a conference dialer application receives a meeting notification from a calendar application, where the meeting notification describes a meeting hosted on a conference system and includes at least one conference access code used to access the conference system. The conference dialer application prompts the user for voice input. The conference dialer application receives a first voice input from the user indicating to the user equipment to join the meeting on the conference system. The conference dialer application, responsive to the first voice input, automatically supplies the at least one conference access code in order to join the meeting. Finally, the conference dialer application, via a telephone dialer application, connects the user equipment to the meeting on the conference system.

20 Claims, 13 Drawing Sheets

(56) References Cited

U.S. PATENT DOCUMENTS

| | | |
|---|---|---|
| 2010/0205540 A1 | 8/2010 | Gupta et al. |
| 2011/0135079 A1 | 6/2011 | Shah et al. |
| 2011/0182415 A1 | 7/2011 | Jacobstein et al. |
| 2012/0230484 A1 | 9/2012 | Kannappan et al. |
| 2013/0183945 A1 | 7/2013 | Garg et al. |

* cited by examiner

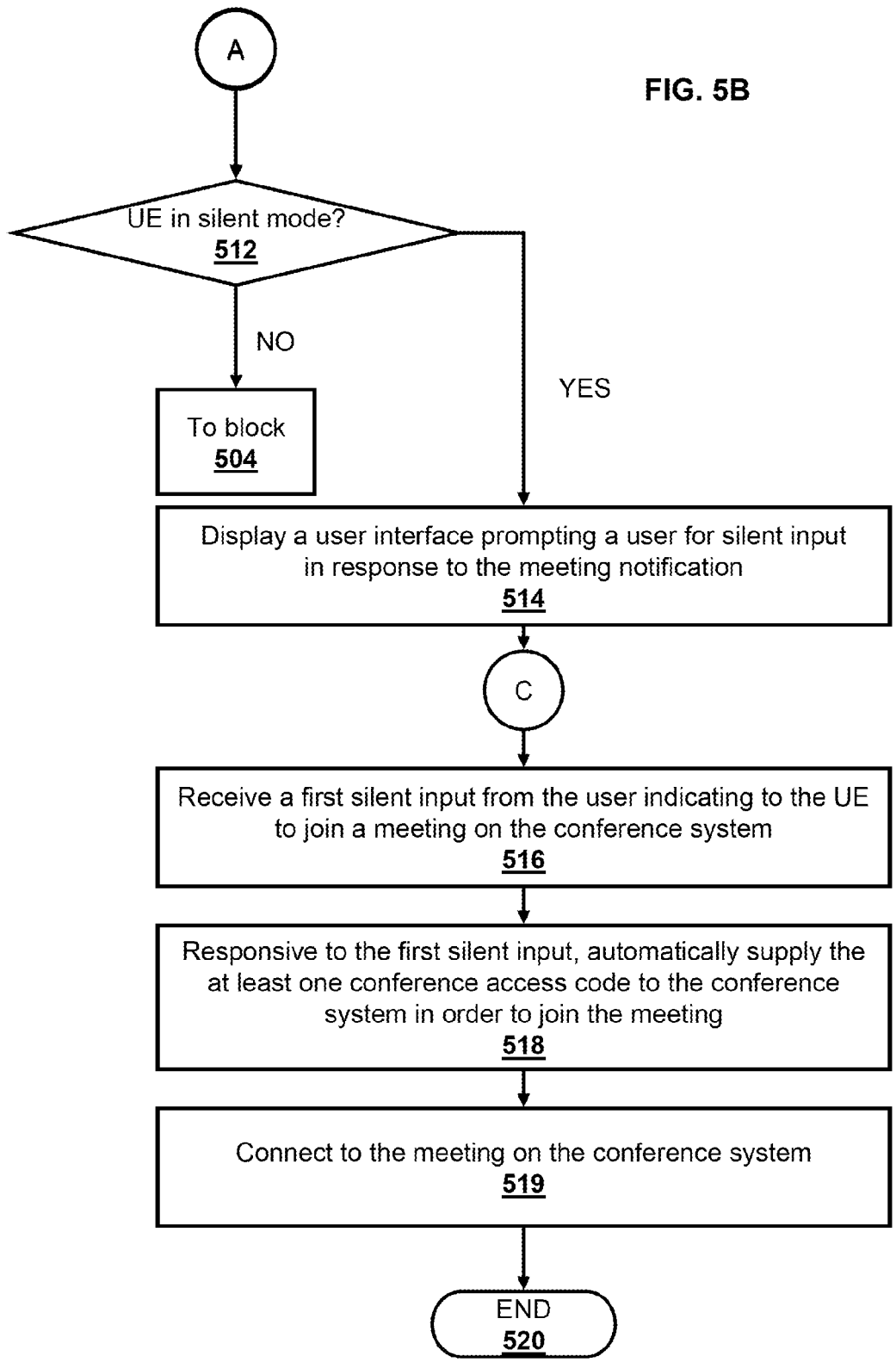

SYSTEM AND METHOD FOR ACCESSING A CONFERENCE SYSTEM

CLAIM OF PRIORITY

This application is a continuation application of pending U.S. application Ser. No. 13/705,337 filed on Dec. 5, 2012. The contents of this document are hereby incorporated by reference within.

BACKGROUND OF THE INVENTION

The present invention relates in general to a data processing system. More particularly, and not by way of limitation, the present invention is directed to a system and method for accessing a conference system.

As a time and cost-effective alternative to face-to-face meetings, businesses utilize conference systems in order to host virtual meetings. Before a virtual meeting, a meeting attendee receives a telephone number and at least one passcode via a message such as an e-mail message or a meeting reminder from a calendar program. The meeting attendee first dials the telephone number to access the conference system, and when prompted, dials at least one access code to access a particular virtual meeting corresponding to the access code.

Disadvantages to such a conference system are that: (1) the user is required to quickly learn a large number of digits (e.g., a ten-digit telephone number and an eight-digit passcode) and (2) the user frequently has to manually dial the telephone number and passcode. If the user forgets, transposes, or otherwise incorrectly enters a digit, the user is required to start the entire dialing process over. If the user attempts to contact the conference system via a mobile phone, the user frequently has to switch between the phone dialer and the message containing the telephone number and passcode in order to successfully enter the required digits.

Thus, it would be advantageous to have a system and method for connecting a conference system that overcomes the disadvantages of the prior art. The present invention provides such a system and method.

BRIEF SUMMARY OF THE INVENTION

The present invention includes the advantages of connecting to a conference system with minimal user interaction with a user equipment. Such an advantage facilitates conference system connection when the user might be otherwise engaged. Also, the invention presents an advantage in that the user is not required to memorize or manually enter conference system access information in order to join a meeting hosted by the conference system.

Thus, in one aspect, the present invention is directed to a user equipment that includes at least one processor, which is further coupled to a non-transitory computer-readable storage medium. The computer-readable storage medium also includes computer-readable instructions, when executed by the at least one processor, are configured to receive a meeting notification from a calendar application, where the meeting notification describes a meeting hosted on a conference system and includes at least one conference access code used to access the conference system. The computer-readable instructions are further configured to prompt the user for voice input in response the meeting notification. The computer-readable instructions are further configured to receive a first voice input from the user indicating to the user equipment to join the meeting on the conference system. The computer-readable instructions are further configured to, responsive to the first voice input, automatically supply the at least one conference access code form the meeting notification to the conference system in order to join the meeting. The computer-readable instructions are further configured to connect to the meeting on the conference system.

In another aspect, the present invention is directed to a method for connecting a user equipment to a conference system. A conference dialer application receives a meeting notification from a calendar application, where the meeting notification describes a meeting hosted on a conference system and includes at least one conference access code used to access the conference system. The conference dialer application prompts the user for voice input in response to the meeting notification. The conference dialer application receives a first voice input from the user indicating to the user equipment to join the meeting on the conference system. The conference dialer application, responsive to the first voice input, automatically supplies the at least one conference access code in order to join the meeting. Finally, the conference dialer application via a telephone dialer application connects the user equipment to the meeting on the conference system.

The method also may include the conference dialer application determining if the user equipment is set to a silent mode. And in response to determining that the user equipment is set to a silent mode, the conference dialer application displays a user interface prompting a user for silent input in response to the meeting notification. The conference dialer then receives, via the user interface, a first silent input from the user indicating to the user equipment to join a meeting on the conference system. In response to the first silent input, the conference dialer application automatically supplies at least one conference access code to the conference system in order to join the meeting.

The method may also include the conference dialer application connecting to a three-way conference with a user-requested contact and the conference system, responsive to a second voice input.

The method may also include the conference dialer application forwarding the meeting notification to at least one user-requested contact, in response to a third voice input.

The method may also include the conference dialer application delaying access to the conference system for a predetermined time period, in response to a fourth voice input.

The method may also include the conference dialer application cancelling access to the conference system, in response to a fifth voice input.

In another aspect, the present invention is directed to a non-transitory computer-readable storage medium. The computer-readable storage medium also includes computer-readable instructions, when executed by the at least one processor, are configured to receive a meeting notification from a calendar application, where the meeting notification describes a meeting hosted on a conference system and includes at least one conference access code used to access the conference system. The computer-readable instructions are further configured to prompt the user for voice input in response the meeting notification. The computer-readable instructions are further configured to receive a first voice input from the user indicating to the user equipment to join the meeting on the conference system. The computer-readable instructions are further configured to, responsive to the first voice input, automatically supply the at least one conference access code form the meeting notification to the conference system in order to join the meeting. The computer-readable instructions are further configured to connect to the meeting on the conference system.

In yet another aspect, the present invention is directed to a system for connecting a user equipment to a conference system. The system includes a user equipment that includes at least one processor, which is further coupled to a non-transitory computer-readable storage medium. The computer-readable storage medium also includes computer-readable instructions, when executed by the at least one processor, are configured to receive a meeting notification from a calendar application, where the meeting notification describes a meeting hosted on a conference system and includes at least one conference access code used to access the conference system. The computer-readable instructions are further configured to prompt the user for voice input in response the meeting notification. The computer-readable instructions are further configured to receive a first voice input from the user indicating to the user equipment to join the meeting on the conference system. The computer-readable instructions are further configured to, responsive to the first voice input, automatically supply the at least one conference access code form the meeting notification to the conference system in order to join the meeting. The computer-readable instructions are further configured to connect to the meeting on the conference system. The system also includes a conference system, that further includes at least one processor a non-transitory computer-readable storage medium, coupled to the at least one processor, wherein the non-transitory computer-readable storage medium further includes computer-readable instructions, when executed by the at least one processor, are configured to receive at least one conference access code from the user equipment. The computer-readable instructions are further configured to assign the user equipment to a virtual meeting corresponding to the at least one conference access code. The computer-readable instructions are further configured to connect the user equipment to the virtual meeting.

BRIEF DESCRIPTION OF THE SEVERAL VIEWS OF THE DRAWING

In the following section, the invention will be described with reference to exemplary embodiments illustrated in the figures, in which:

FIG. 5A-5J are flowcharts illustrating a method for connecting to a conference system in accordance with an embodiment of the present invention.

DETAILED DESCRIPTION OF THE INVENTION

The methods described herein can be implemented in any appropriate type of telecommunications system supporting any suitable communication standards and using any suitable components. Particular embodiments of the described methods may be implemented in a network such as illustrated in FIG. 1.

Figure 1:
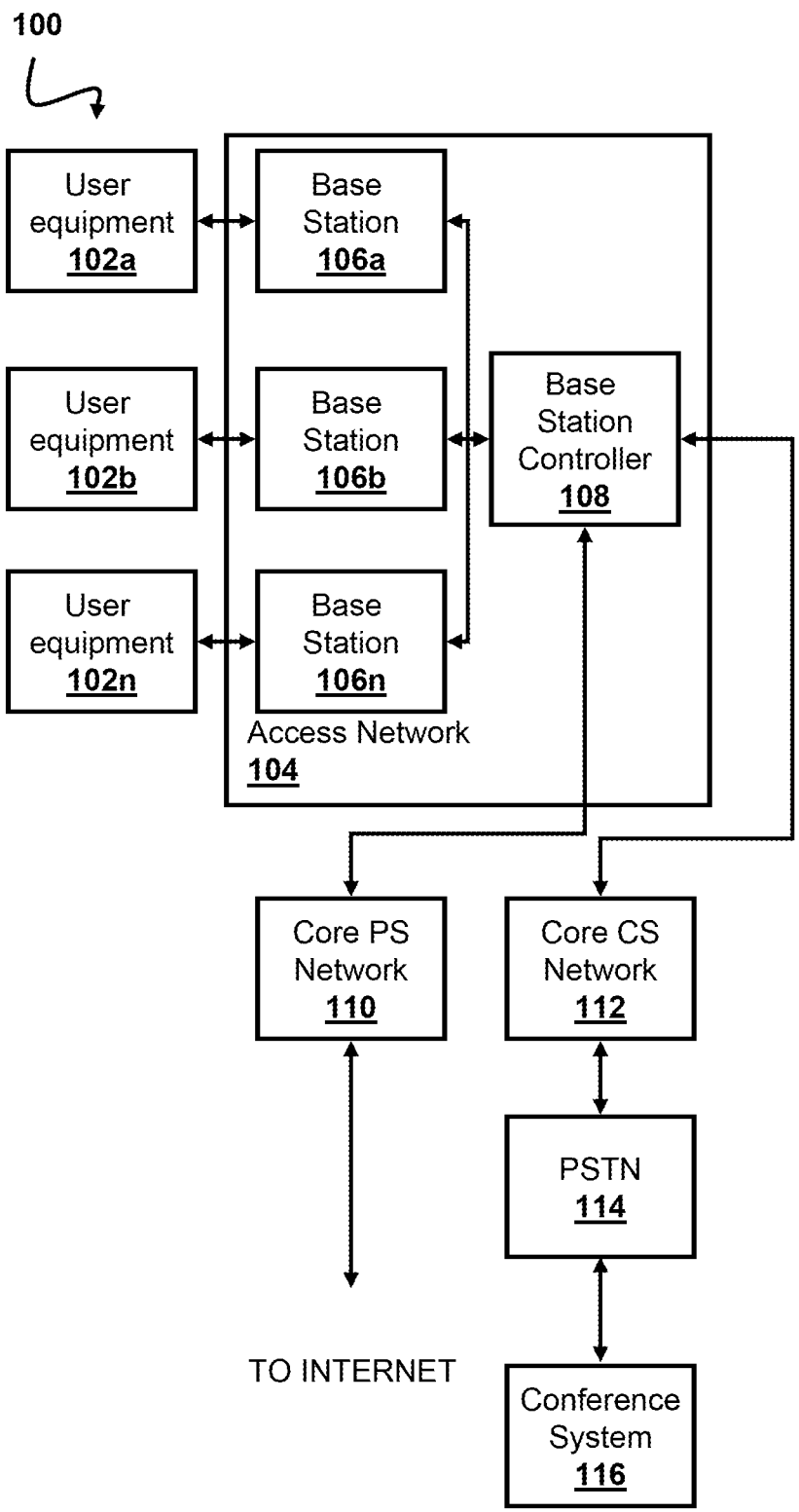
FIG. 1 is a block diagram illustrating a general system view of an user equipment (UE), network, and conference system, in accordance with an embodiment of the present invention.

FIG. 1 is a block diagram illustrating a general system view of user equipment (UE), an access network, and a conference system according to an embodiment of the present invention. System 100 includes, but is not limited to, user equipment (UE) 102a-102n, an access network 106, a core packet-switched (PS) network 110, a core circuit-switched (CS) network 112, a public-switched telephone network (PSTN) 114, and a conference system 116.

As illustrated, UE 102a-102n communicate with conference system 116, via access network 104, core CS network 112, and PSTN 114. In particular, UE 102a-102n communicate with conference system 116 by first connecting to at least one of base stations 106a-106n in access network 104. Base stations 106a-106n, controlled by base station controller (BSC) 108, receives and transmits wireless signals from UEs 102a-102n in order to facilitate the communication with other devices such as, but not limited to, other UEs, landline telephones, and conference system 116. BSC 108, coupled to base stations 106a-106n, handles a variety of tasks in access network 104 including, but not limited to, allocating radio channels, controlling handover operations of a UE from one base station to another, and communicating with core PS network 110 (for packet-switched communication) and core CS network 112 (for circuit-switched communication).

Core PS network 110 enables a second-generation (2G), third-generation (3G), and/or Wideband Code Division Multiple Access (WCDMA) mobile network to transmit Internet Protocol (IP) packets to external network such as the Internet. Core PS network 110 also includes a collection of nodes (not shown) such as the Gateway GPRS support node (GGSN), Serving GPRS support node (SGSN), and the like. Core CS network 112 enables UE 102a-102n to communicate with each other and other devices (e.g., landline telephones and conference system 116) via PSTN 114. Core CS network 112 also includes a collection of nodes (not shown) such as, but not limited to, a Home Location Register (HLR), a Visitor Location Register (VLR), and a Mobile Switching Center (MSC).

All of the described nodes (e.g., BSC 108, GGSN, SGSN, HLR, VLR, MSC, etc.) and any other mobile communications node may be provided by a processor executing instructions on a non-transitory computer-readable medium. Alternative embodiments of system 100 may include additional components responsible for providing additional functionality, including any of the functionality described above or herein, and/or any functionality necessary to support the methods described herein. Also, alternative embodiments of system 100 include connections between conference system 116 and core PS network 110 in additional to or in lieu of the connections between conference system 116, PSTN 114, and core CS network 112 (not pictured).

Figure 2A:
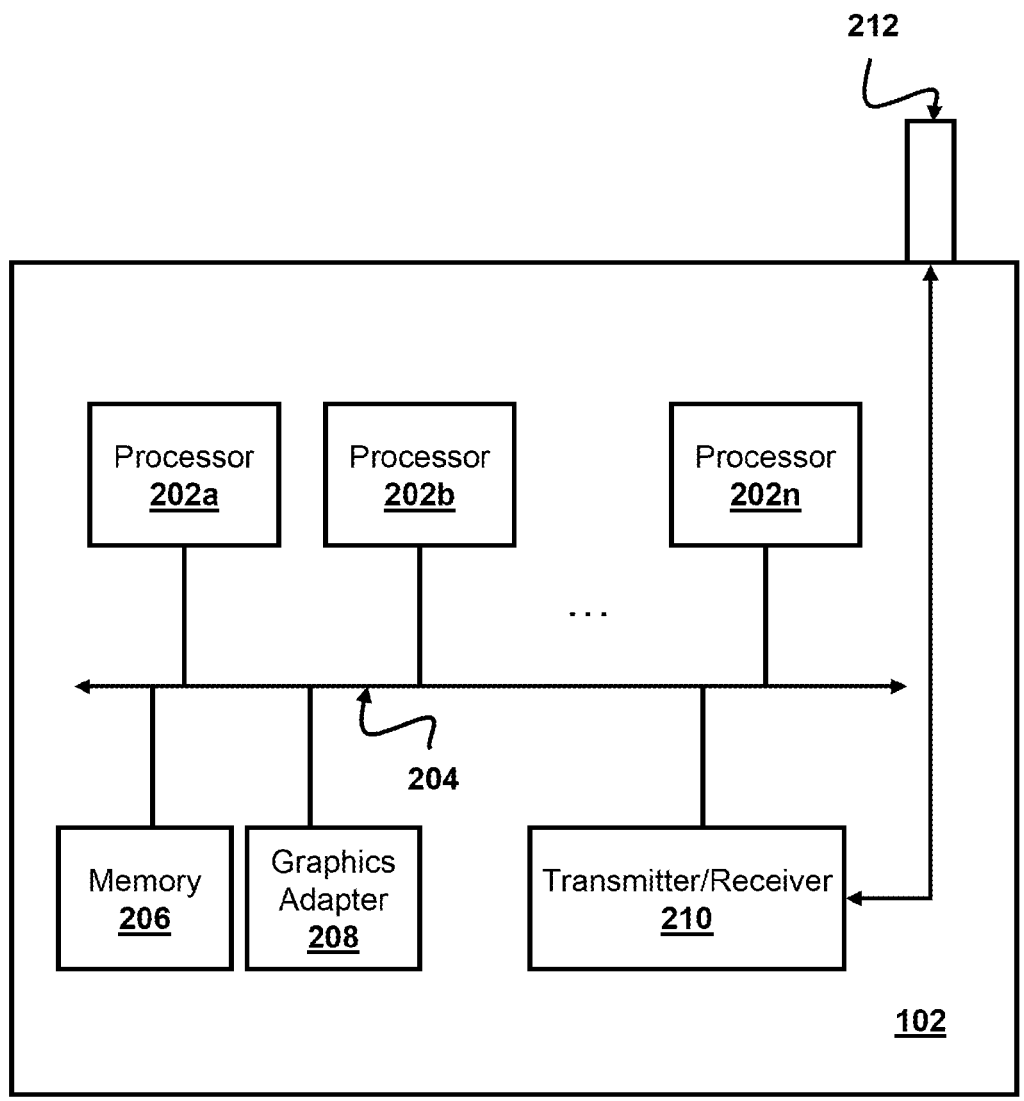
FIG. 2A is a more detailed block diagram depicting an UE according to an embodiment of the present invention.

FIG. 2A is a block diagram depicting an example UE 102 in accordance with an embodiment of the present invention. UE 102 can be utilized to implement any of UE 102a-102n as discussed in conjunction with FIG. 1. As illustrated, UE 102 includes a collection of processors 202a-202n, which are coupled to a memory 206, a graphics adapter 208, and a transmitter/receiver 210 via interconnect 204. Processors 202a-202n can be implemented by any microprocessor and may include microprocessors with more than one processing core. Memory 206 can be implemented by any non-transitory computer-readable medium, such as, but not limited to, flash memory, a hard disk drive, read-only memory (RAM) and the like. Memory 206 further includes computer-readable instructions, when executed by processors 202a-202n, are configured to implement the methods described herein. The contents of memory 206 are further discussed in conjunction with FIG. 3A.

Still referring to FIG. 2A, UE 102 further includes graphics adapter 208 and transmitter/receiver 210, which is further coupled to antenna 212. Graphics adapter 208 enables UE to display text and graphics on a display, which enables user interaction with the UE. For example, graphics adapter 208, in conjunction with processors 202a-202n and computer-readable instructions stored on memory 206, enables UE 102 to display a graphical user interface such as user interface 300 (FIG. 3) and/or graphical user interface 400, which is discussed in more detail in conjunction with FIG. 4. Transmitter/receiver 210 via antenna 212 enables UE 102 to communicate with a base station in an access network, such as base stations 106a-106n (FIG. 1) of access network 104 (FIG. 1). Alternative embodiments of the present invention may include additional components responsible for providing additional functionality, including any functionality described herein and/or any functionality necessary to support the solution described herein.

Figure 2B:
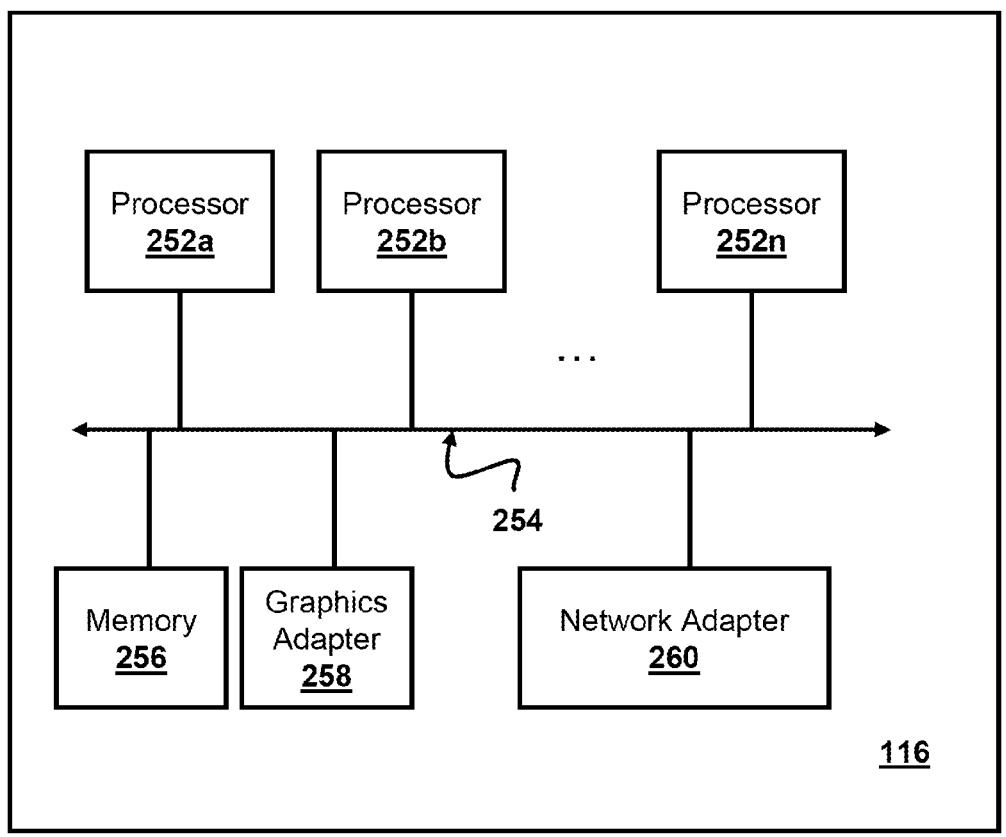
FIG. 2B is a more detailed block diagram illustrating a conference system according to an embodiment of the present invention.

FIG. 2B is a block diagram depicting an example conference system 116 in accordance with an embodiment of the present invention. As illustrated, conference system 116 includes a collection of processors 252a-252n, which are coupled to memory 256 via interconnect 254. Processors 252a-252n can be implemented by any microprocessor and may include microprocessors with more than one processing core. Memory 256 can be implemented by any non-transitory computer-readable medium, such as, but not limited to, flash memory, a hard disk drive, read-only memory (RAM) and the like. The contents of memory 256 are further discussed in conjunction with FIG. 3B.

Still referring to FIG. 2B, conference system 116 further includes a graphics adapter 258 and a network adapter 260. Graphics adapter 258 enables conference system to display text and graphics on a display, which enables operator interaction with conference system 116. Network adapter 260 enables conference system 116 to communicate with an external network such as PSTN 114 (FIG. 1) and/or the Internet. Alternative embodiments of the present invention may include additional components responsible for providing additional functionality, including any functionality described herein and/or any functionality necessary to support the solution described herein.

Figure 3A:
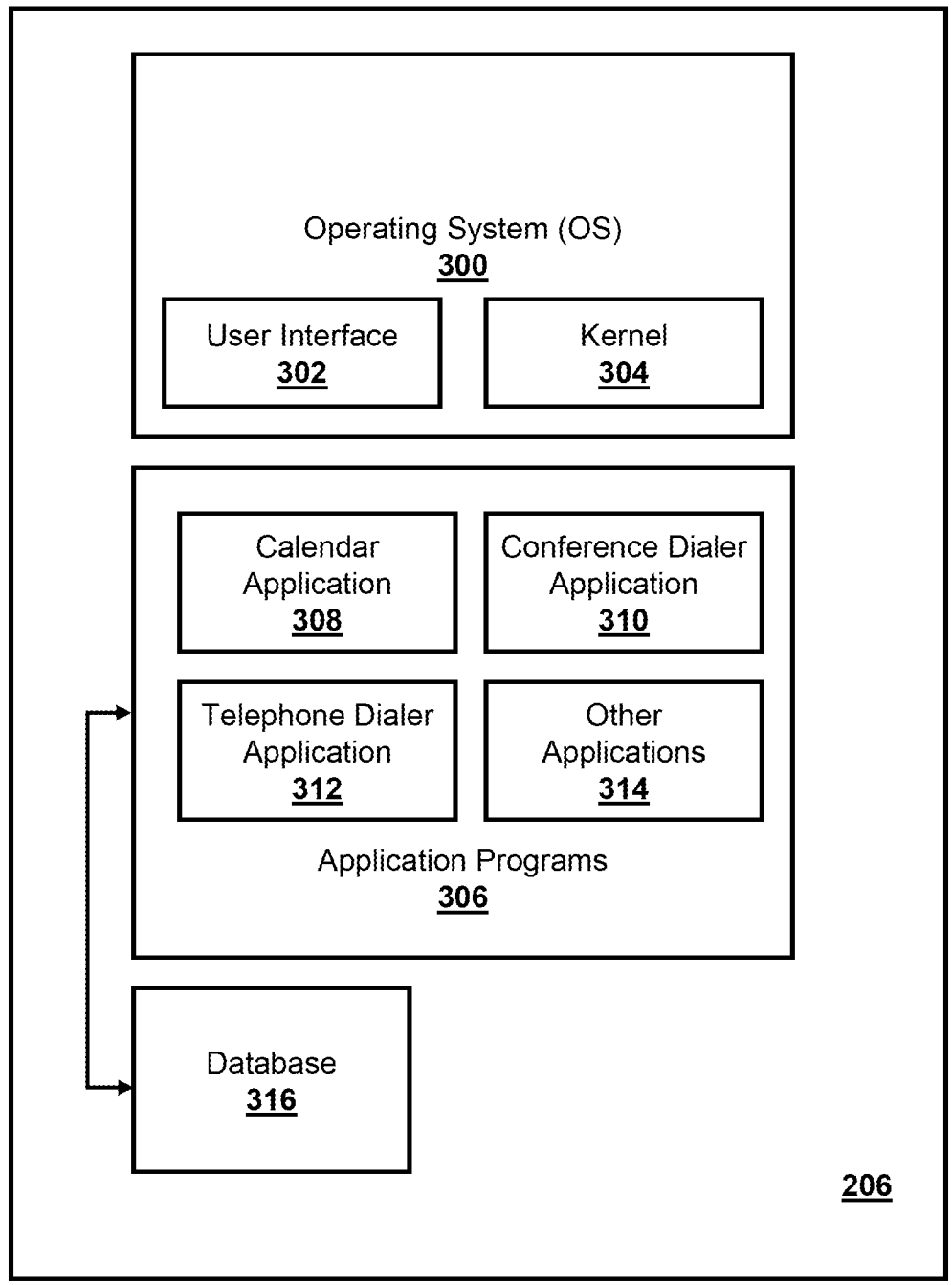
FIG. 3A is a block diagram depicting contents of a memory of the user equipment shown in FIG. 2A, in accordance with an embodiment of the present invention.

FIG. 3A is a block diagram illustrating a more detailed view of the contents of a UE memory in accordance with an embodiment of the present invention. As previously discussed, memory 206 (FIG. 2) of UE 102 (FIG. 2) includes computer-readable instructions. These computer-readable instructions, when executed by a processor, are configured to implement the methods described herein as well as provide other functionality for UE 102. As illustrated, memory 206 includes an operating system (OS) 300, which further includes a user interface 302 and a kernel 304. User interface 302 provides transparent user access to resources such as application programs 306. Generally, user interface 302 is a program that interprets user commands entered by a user and sends the interpreted command(s) to the appropriate lower levels of the operating system (e.g., kernel 304) for processing. Embodiments of the present invention enable a user to enter user commands using any type of interface such as, but not limited to, a keyboard, a voice interface, and a gestural interface. An example of user interface 302 is graphical user interface 400, discussed herein more detail in conjunction with FIG. 4.

As illustrated, OS 300 also includes kernel 304, which includes lower levels of functionality for OS 300, including providing essential services required by other parts of OS 300 and application programs 306 including, but not limited to, memory management, process and task management, disk management, and user interface management. Application programs 306 can include a calendar application 308, conference dialer application 310, telephone dialer application 312, and other applications 314, which include, but are not limited, utilities, games, productivity, social media, or navigation applications. Also, memory 206 includes a database 316, which includes data stored and accessed during the operation of application programs 306. As discussed herein in more detail, database 316 includes calendar, appointment, and contact list entries that are accessed by calendar application 308.

Calendar application 308 provides users with an electronic version of a calendar and can provide additional functionality such as an appointment book, address book, or contact list. Calendar application 308 can be implemented as a standalone application designed for individual use. In a standalone implementation, a single user views, adds, and deletes calendar and/or appointment entries in order to keep track of appointments and important dates. Calendar application 308 can also be implemented as a networked application that allows for sharing of information between multiple users. An example of a networked calendar application is Microsoft Outlook with Exchange Server, a product of Microsoft Corporation of Redmond, Wash. When implemented as a networked application, not only can an individual user view, add, and delete calendar and/or appointment entries, other users using different devices can view, add, or delete such entries on behalf of the individual user. FIG. 3C illustrates an exemplary appointment entry that can be viewed, added, or deleted within calendar application 308.

According to an embodiment of the present invention, an appointment entry used by calendar application 308 (FIG. 3A) can be implemented by a record data structure that includes multiple fields. A collection of appointment entries can be implemented by an array of records. As illustrated in FIG. 3C, an appointment entry 350 includes an appointment title field 352, an appointment time field 354, an appointment description field 356, conference system phone number field 358, and conference system passcode field 360.

Appointment title field 352 includes information regarding the title of a specific appointment. For example, a conference with a client could be listed in appointment title field 352 as "Teleconference with client X." Appointment time field 354 includes information regarding the appointed time and/or duration of a specific appointment. For example, the abovementioned "teleconference with client X" could be scheduled and recorded in appointment time field 354 as "9:00 AM to 10:00 AM." Appointment description field 356 includes any additional information the user wishes to include in the appointment entry such as a short list of discussion topics, in the abovementioned teleconference example. If the appointment is a telephone conference that requires the user of a conference system (e.g., conference system 116 of FIG. 1), appointment entry 350 can also include a conference phone number and passcode, which are stored in conference system phone number field 358 and conference system passcode field 360, respectively. According to an embodiment of the present invention, a conference system phone number is implemented as a ten-digit number (country code, area code, and seven-digit phone number, e.g., +1-555-555-5555) and the conference system passcode is implemented as an eight-digit number followed by a pound ("#") sign. Of course, the present invention contemplates the implementation of the conference system phone number and conference system passcode by any combination of numbers, letters, and/or symbols, images, or any other kind of unique identifying information.

Of course, appointment entry 350 is not limited to the aforementioned fields, but can include other fields for other types of information. Such other fields are not germane to understanding the present invention and are thus not illustrated or further discussed.

According to an embodiment of the present invention, calendar application 308 also supports sending of notification messages at the time (and/or a predetermined period of time before or after) a scheduled appointment. For example, with reference to the prior "teleconference with client X" appointment example, a user may request to be reminded of the appointment with a notification message five minutes before, at the time of, and five minutes after a time listed in appointment time field 354. The notification message can be implemented as an audible or visual alarm or a message sent between calendar application 308 and another application such as conference dialer application 310. According to an embodiment of the present invention, the notification message can include the information located in the multiple fields of the appointment entry 350 such as the information included in conference system phone number field 358 and conference system passcode field 360.

According to an embodiment of the present invention, conference dialer application 310 receives a meeting notification from calendar application 308. The meeting notification describes a meeting hosted on a conference system (e.g., conference system 116 of FIG. 1) and also includes at least one conference access code used to access the conference system. The at least one conference access code, according to an embodiment of the present invention, can be a telephone number and a passcode. Upon receiving the meeting notification, conference dialer application 310 prompts a user for voice input. Conference dialer application 310, via user interface 302 and kernel 304, receives a first voice input from the user indicating a desire to join the meeting on the conference system. In response to the first voice input, conference dialer application 310 automatically supplies the telephone number and passcode to the conference system manager of a conference system, via telephone dialer application 312, in order to join the meeting on the conference system.

Figure 3B:
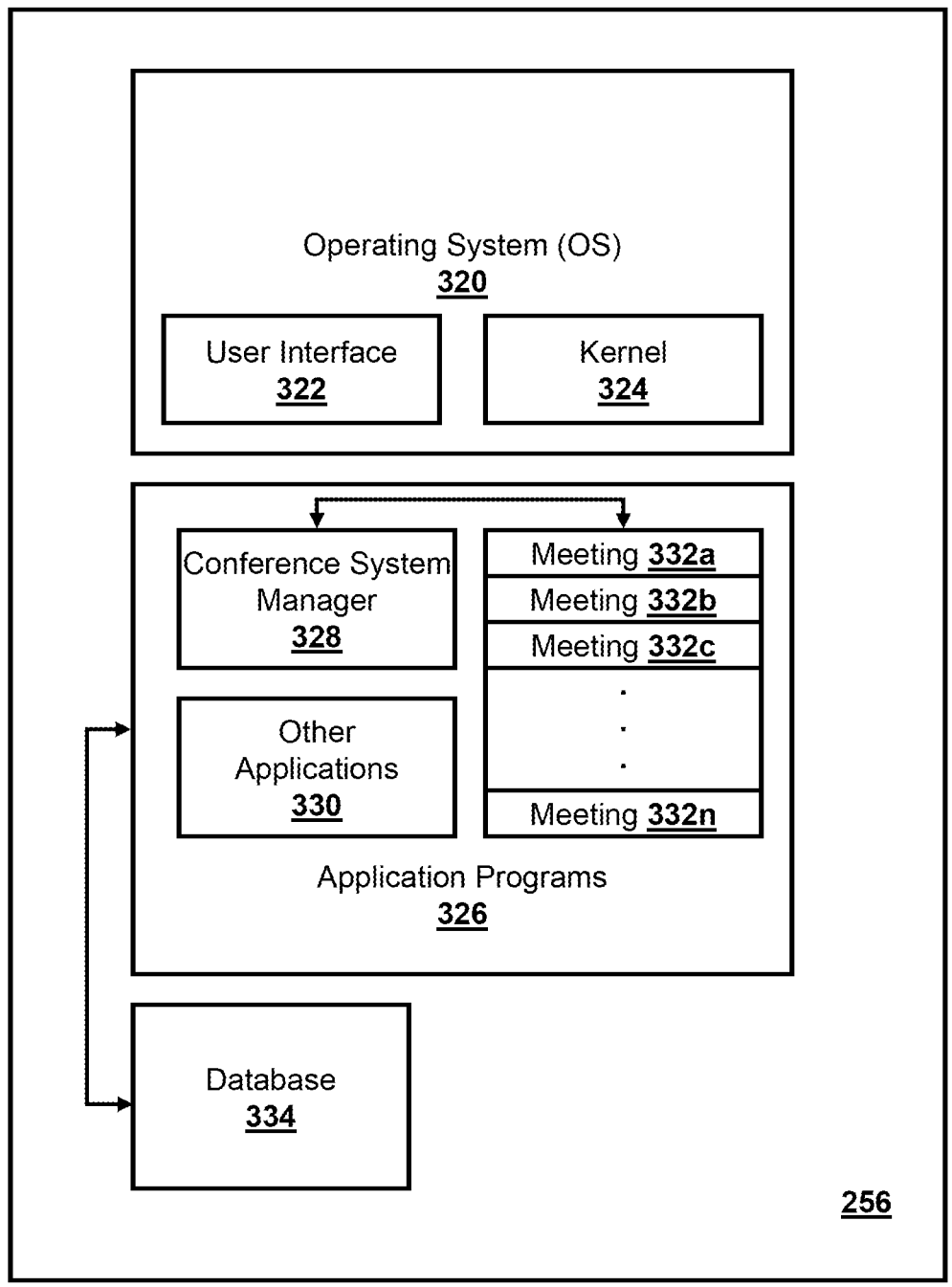
FIG. 3B is a block diagram illustrating contents of a memory of the conference system shown in FIG. 2B, in accordance with an embodiment of the present invention.
Figure 3C:
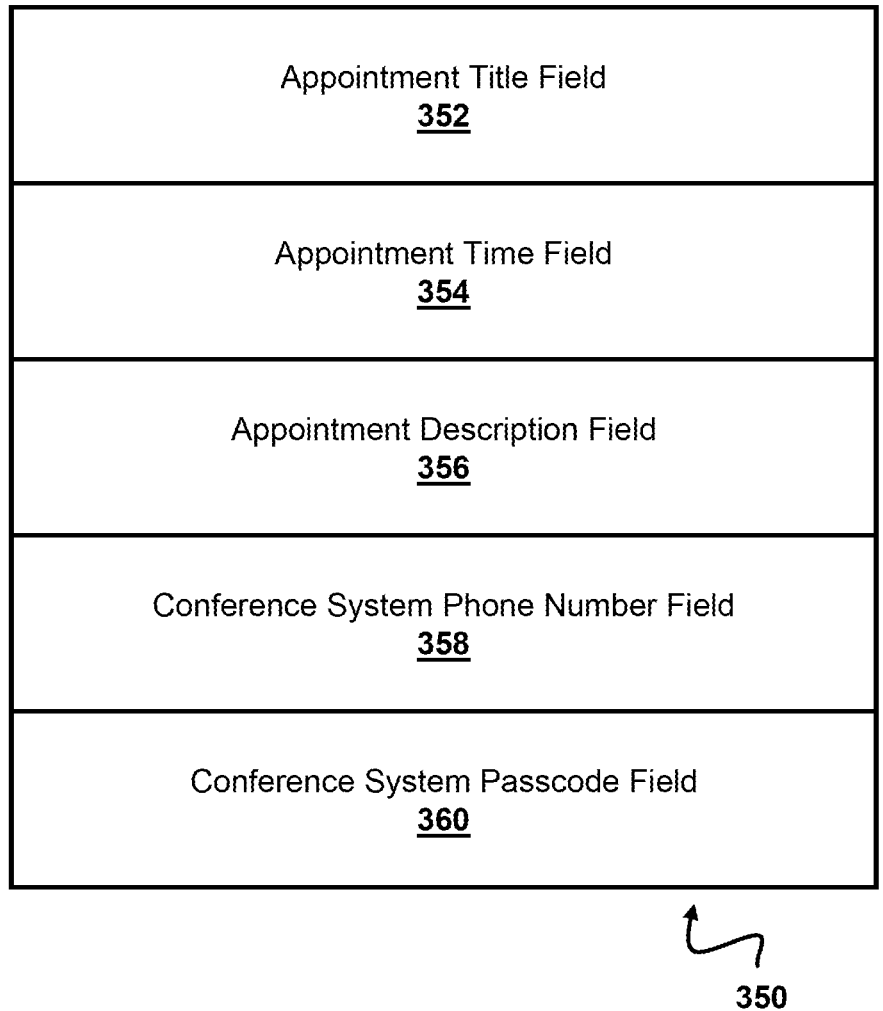
FIG. 3C is a block diagram depicting an exemplary appointment entry record in accordance with an embodiment of the present invention.

FIG. 3B is a block diagram depicting a more detailed view of the contents of a conference system memory in accordance with an embodiment of the present invention. As previously discussed, memory 256 (FIG. 2B) of conference system 116 (FIG. 2B) includes computer-readable instructions, when executed by a processor, are configured to support the solutions described herein as well as provide other functionality for conference system 116. As illustrated, memory 256 includes an operating system (OS) 320, which further includes a user interface 322 and a kernel 324. User interface 322 provides transparent operator access to resources such as application programs 326. Generally, user interface 322 is a program that interprets operator commands entered by an operator and sends the interpreted command(s) to appropriate lower levels of the OS (e.g., kernel 324) for processing. Embodiments of the present invention enable an operator to enter operator commands using any type of interface such as, but not limited to, a keyboard, a voice interface, and a gestural interface.

As illustrated, OS 300 also includes kernel 304, which includes lower levels of functionality for OS 300, including providing essential services required by other parts of OS 300 and applications programs 306 including, but not limited to, memory management, process and task management, disk management, and user interface management. Application programs 326 can include a conference system manager 328, which manages and controls access to a collection of virtual meetings 332a-332n and other applications 330, which can include, but are not limited to, utilities and other management applications. Also, memory 256 includes a database 334, which includes data stored and accessed during the operation of application programs 326.

According to an embodiment of the present invention, conference system manager 328 interfaces with networks such as PSTN 114 (FIG. 1) and/or the Internet to coordinate virtual meetings (e.g., meeting 332a-332n) between multiple users. To start a virtual meeting, a UE (e.g., UE 102a-102n of FIG. 1) dials a phone number associated with the conference system 116. Once the UE is connected, conference system manager 328 optionally prompts the UE for a conference system passcode. Upon receipt of the conference system passcode, conference system manager 328 assigns the UE to one of meeting 332a-332n that corresponds to the received conference system passcode. Conference system manager 328 can also optionally perform other tasks such as, for example, conference scheduling, provide additional virtual meeting functions for a user designated as a "moderator," and the like.

Figure 4:
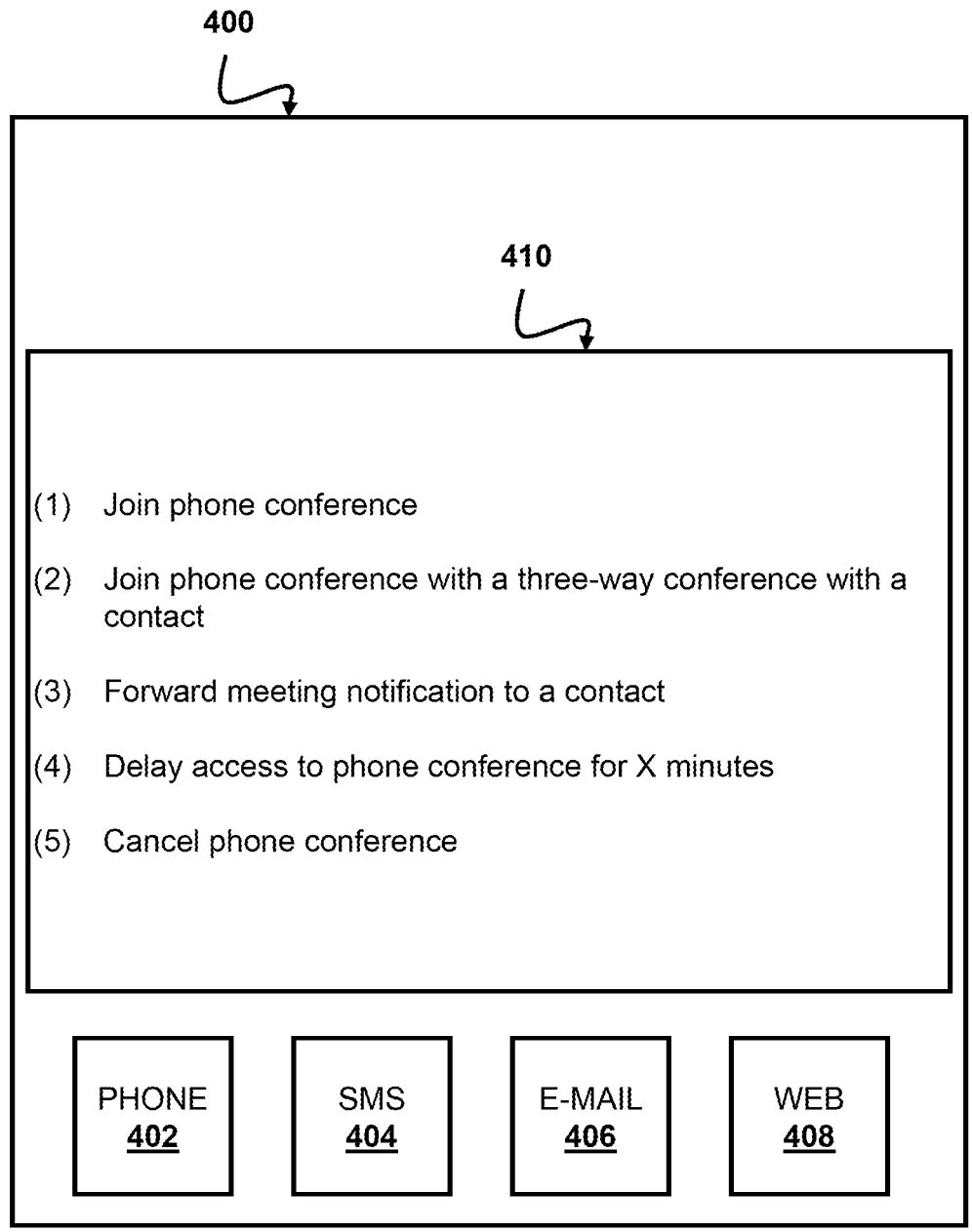
FIG. 4 is a depicts a graphical user interface of the UE in accordance with an embodiment of the present invention.

FIG. 4 is a depicts a graphical user interface of the UE in accordance with an embodiment of the present invention. A graphical user interface (GUI) 400 (which can be utilized to implement user interface 302 (FIG. 3A) of a UE) includes a collection of icons 402, 404, 406, and 408, as well as menu screen 410. Icons 402, 404, 406, and 408, when selected, enable a user to launch associated applications. For example, the selection of a phone icon 402 enables a user to launch a telephone dialer application (e.g., telephone dialer application 312 of FIG. 3A). The selection of a SMS icon 404 enables a user to launch a short message service (SMS) application that facilities the display, sending, and receiving of SMS and multimedia messaging service (MMS) messages. The selection of an e-mail icon 406 enables a user to launch an e-mail application. The e-mail application enables a user to view, create, send, and receive e-mail messages. The selection of a web icon 408 enables a user to launch a World Wide Web (WWW) browser application (e.g., Microsoft Internet Explorer by Microsoft Corporation of Redmond, Washington). The browser application enables the user to access information stored on the World Wide Web.

Menu screen 410 enables a user to select amongst a collection of options for interacting with a conference system (e.g., conference system 116 of FIG. 1). According to an embodiment of the present invention, menu screen 410 is used by the user to interact with a conference dialer application (e.g., conference dialer application 310 of FIG. 3) in lieu of a voice input, as discussed herein in more detail in conjunction with FIG. 5A-5J.

FIG. 5A-5J are flowcharts illustrating a method for connecting a device to a conference system in accordance with an embodiment of the present invention. According to an embodiment of the present invention, the device can be a user equipment such as a mobile phone (e.g., user equipment 102 of FIG. 2) or any other type of device such as a computer. An exemplary user equipment includes a memory (e.g., memory 206 of FIG. 2) that further includes computer-readable instructions, when executed by a processor (e.g., processor 202a of FIG. 2), are configured to implement the steps discussed in conjunction with FIG. 5A-5J.

As discussed below, the first voice input, second voice input, third voice input, fourth voice input, and fifth voice input are different types of voice inputs that a user can provide to the user equipment. The user equipment provides different functionality (as discussed below) in response to the different types of voice inputs. Similarly, the first silent input, second silent input, third silent input, fourth silent input, and fifth silent input are different types of silent inputs that a user can provide the user equipment via, for example, menu screen 410 of FIG. 4. The user equipment provides different functionality (as discussed below) in response to the different types of silent inputs.

Figure 5A:
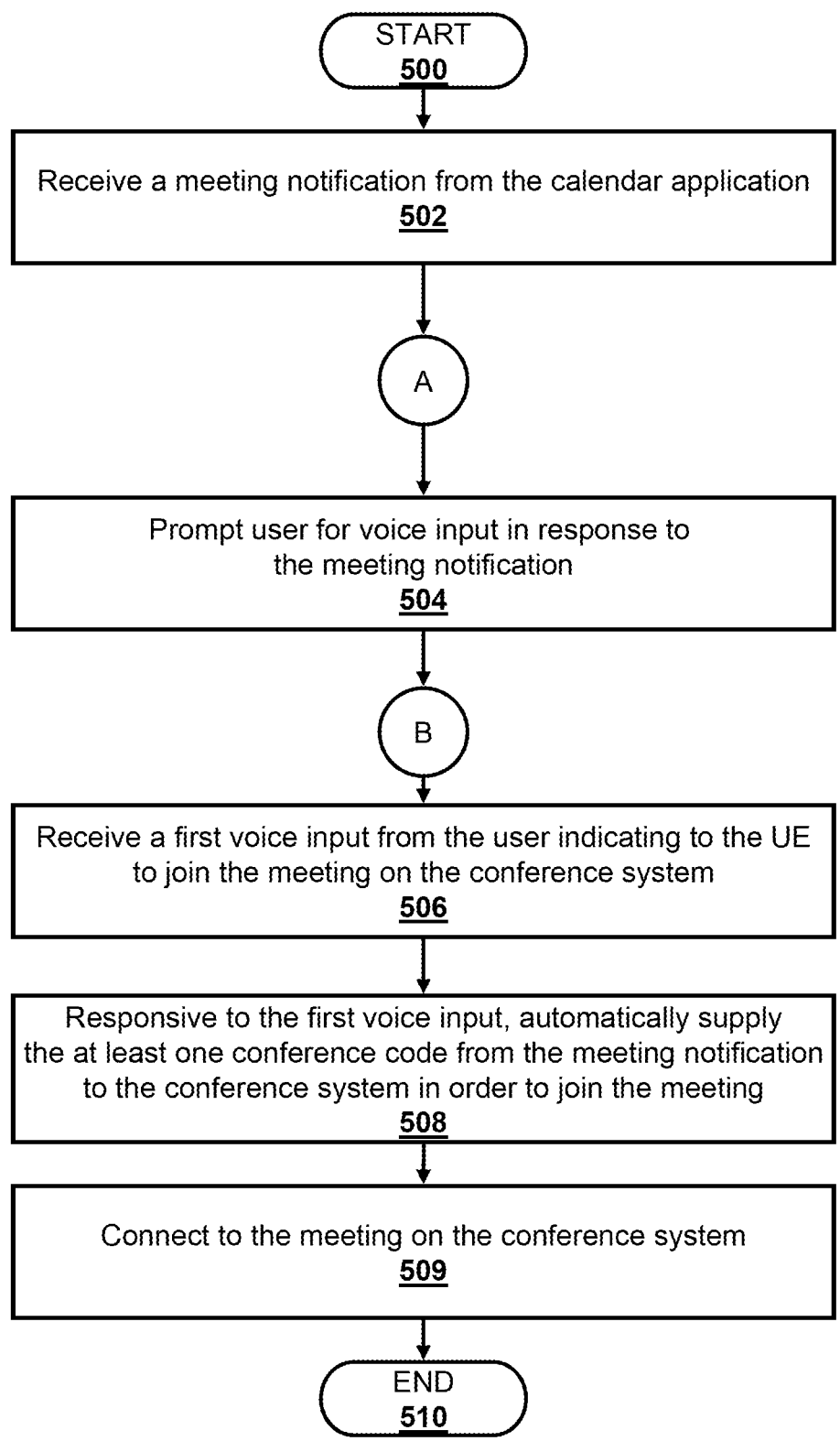
Figure 5C:
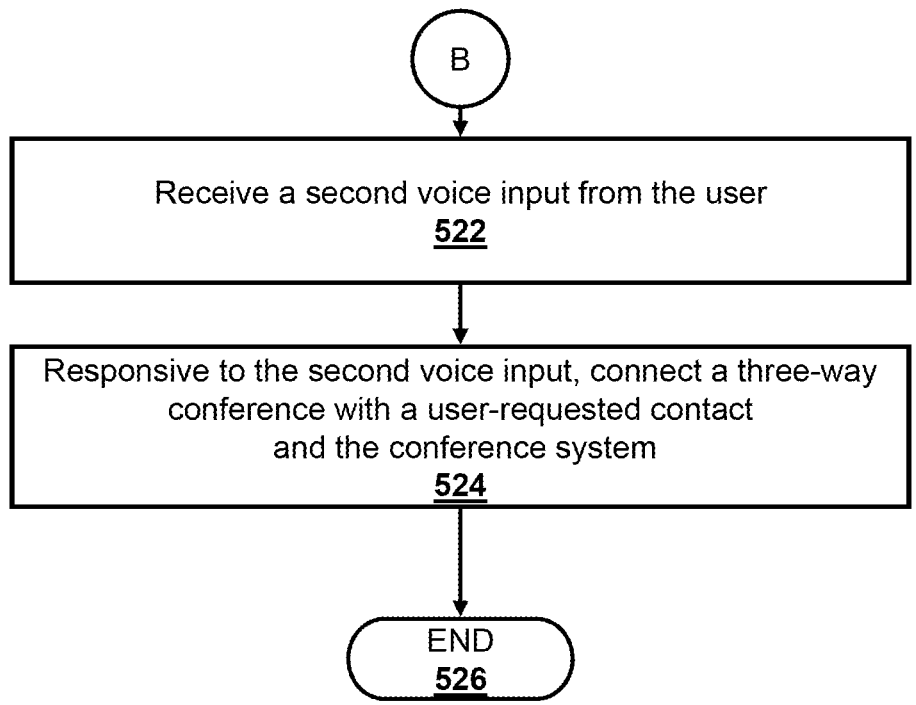
Figure 5D:
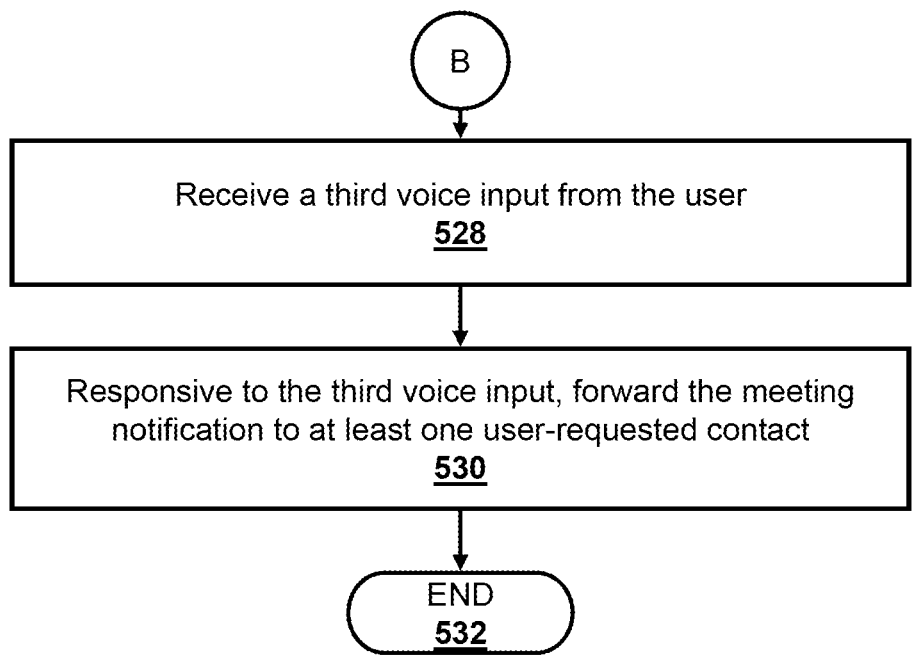
Figure 5E:
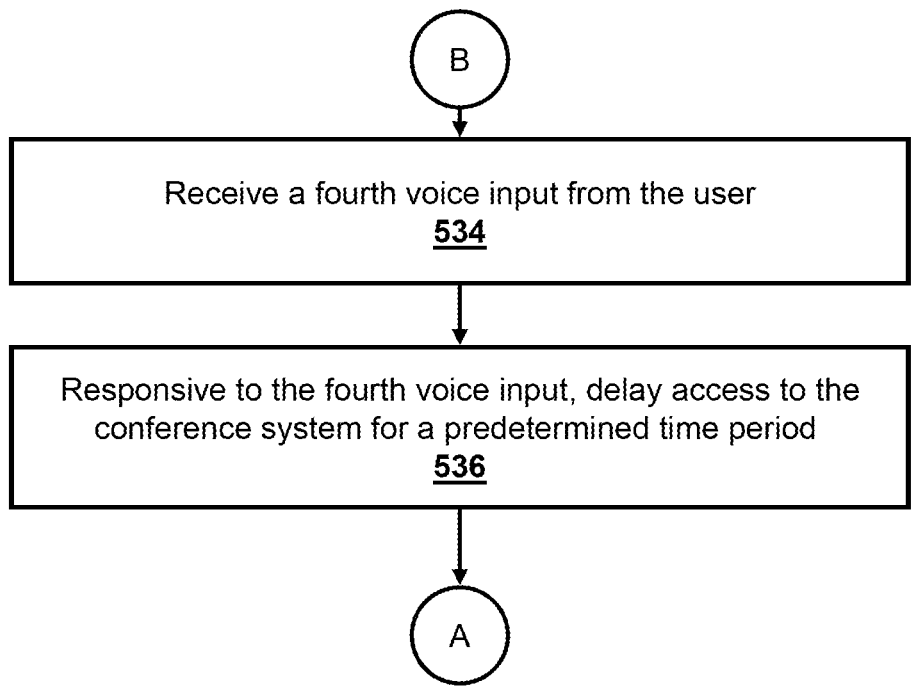
Figure 5F:
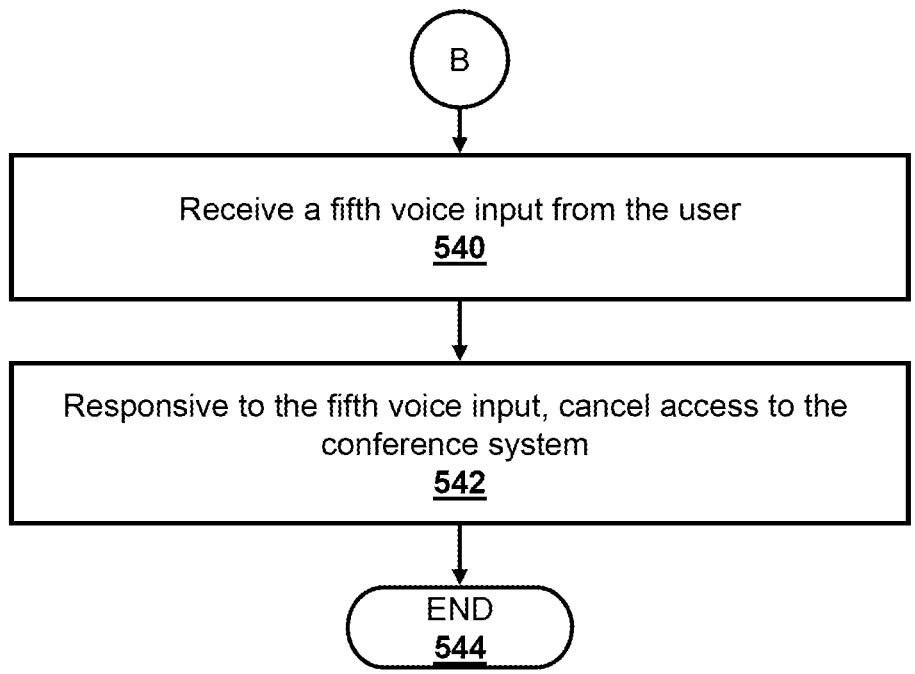
Figure 5G:
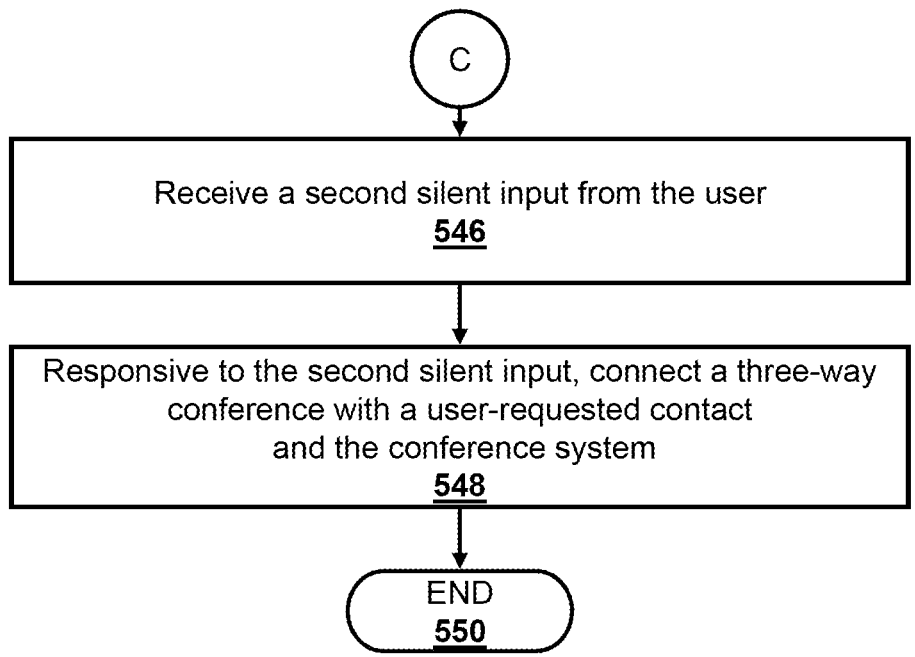
Figure 5H:
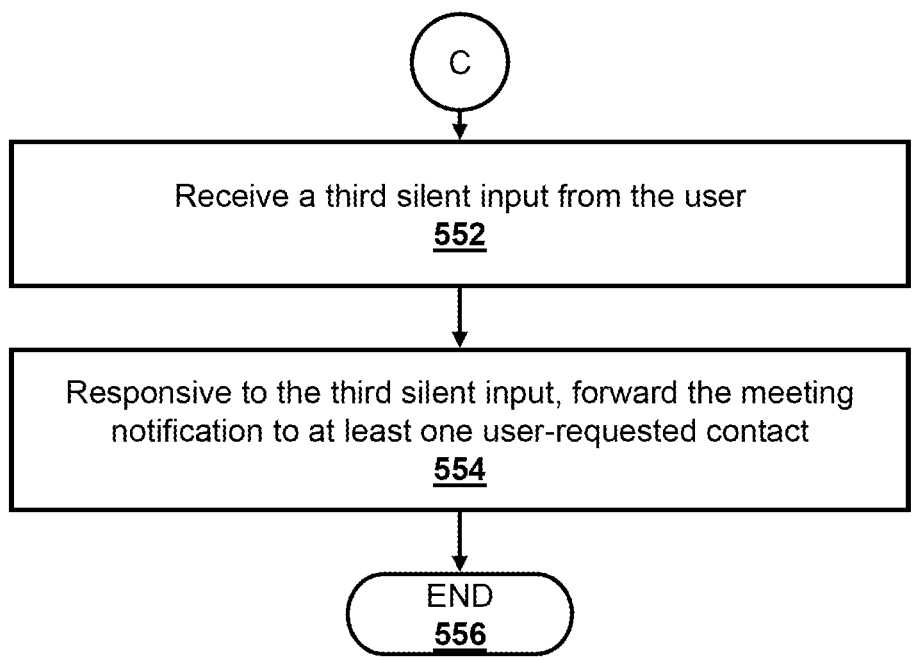
Figure 5I:
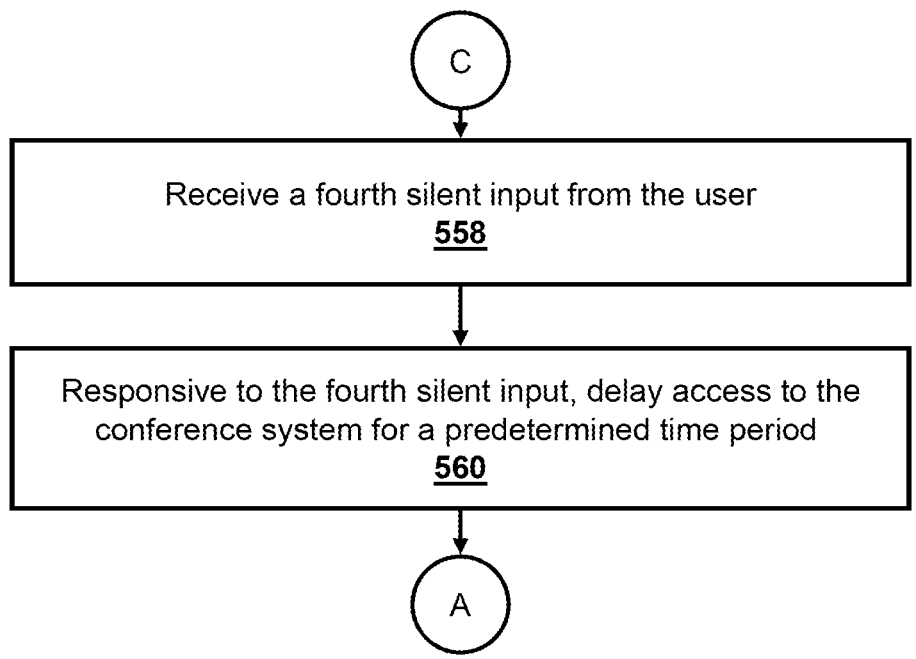
Figure 5J:
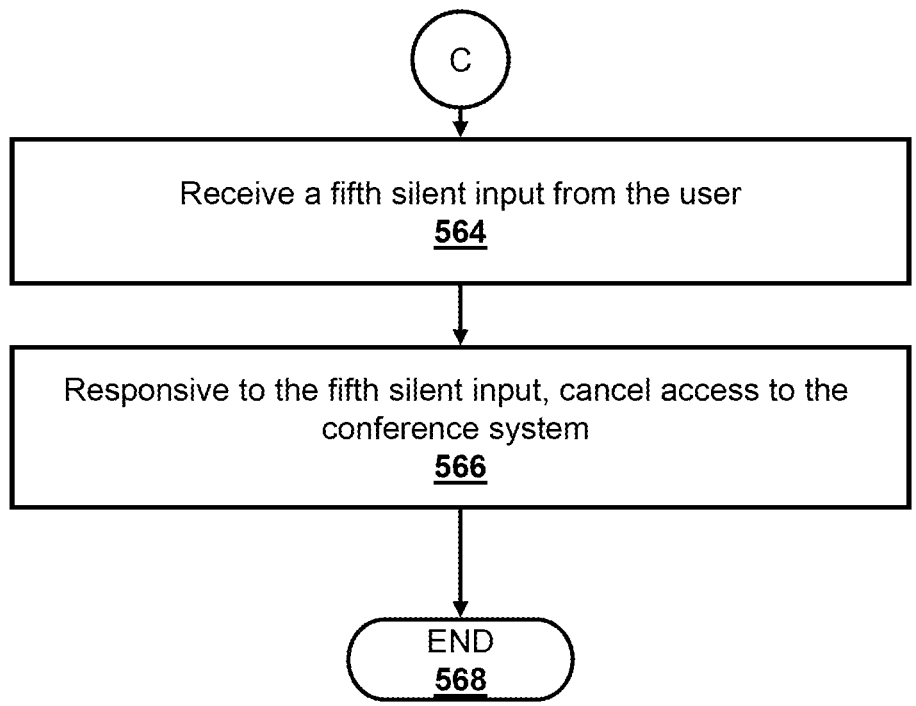

Referring to FIG. 5A, the process begins at step 500 and proceeds to step 502, which illustrates a conference dialer application (e.g., conference dialer application 310 of FIG. 3A) receiving a meeting notification sent from a calendar application (e.g., calendar application 308 of FIG. 3A). The meeting notification can be implemented as a notification message that includes all or some of the information included in multiple fields of an appointment entry (e.g., appointment entry 350 of FIG. 3C) such a conference system phone number and/or a conference system passcode.

The process then proceeds to connector A, which continues to step 512 on FIG. 5B. Referring to FIG. 5B, the conference dialer application determines if the user equipment executing the conference dialer application is set to a "silent" mode. According to an embodiment of the present invention, user equipment can be set in different modes depending on the preference of the user. For example, if the user is at home and the user equipment is left in a different room, the user might want to set the user equipment to a "audible" mode, where the user can be audibly notified of an incoming phone call, SMS or e-mail message, or notifications from other applications on the user equipment. If, however, the user is in a work meeting, movie theater, or otherwise does not wish to be audibly notified, the user can set the user equipment to a "silent" mode, where audible alerts are not issued in the event of an incoming phone call, SMS or e-mail message, or notifications from other applications on the user equipment.

If the conference dialer application determines that the user equipment is not set to a "silent" mode, the process proceeds to step 504 on FIG. 5A. Referring back to FIG. 5A, Step 504 illustrates the conference dialer application prompting a user for voice input in response to the meeting notification. The process then proceeds to connector B. If the conference dialer application receives a first voice input (e.g., user states "join the meeting") from the user indicating to the UE to join the meeting corresponding to the meeting notification (step 506), the conference dialer application automatically supplies at least one conference code from the meeting notification to a telephone dialer application (e.g., telephone dialer application 312 of FIG. 3A) in order to join the meeting. According to an embodiment of the present invention, the at least one conference code can be a conference system phone number and/or conference system passcode included in the meeting notification. The process continues to step 509 where the UE connects to the meeting on the conference system. The telephone dialer application supplies the conference system phone number and/or conference system passcode to a conference system manager (e.g., conference system manager 328 (FIG. 3B) without user interaction. The conference system manager assigns the user equipment to a virtual meeting (e.g., meeting 332a-332n) corresponding to the received conference system passcode and connects the user equipment to the meeting. The process then ends, as illustrated in step 510.

Returning to connector B and referring to FIG. 5C, if the conference dialer application receives a second voice input (e.g., user states "join the meeting and start a three-way conference with John") (step 522) from the user, the conference dialer application connects a three-way conference with a user-requested contact and also connects to the meeting on the conference system (step 524). According to an embodiment of the present invention, the conference dialer application automatically supplies at least one conference code from the meeting notification to a telephone dialer application (e.g., telephone dialer application 312 of FIG. 3A) in order to join the meeting. The conference dialer application also supplies the contact information for the user-requested contact to the telephone dialer application in order to connect to a three-way conference with the user-requested contact. The at least one conference code can be a conference system phone number and/or conference system passcode included in the meeting notification. The telephone dialer application supplies the conference system phone number and/or conference system passcode to a conference system manager (e.g., conference system manager 328 of FIG. 3B) without user interaction. The conference system manager assigns the user equipment to a virtual meeting (e.g., meeting 332a-332n) corresponding to the received conference system passcode and connects the user equipment to the meeting. The telephone dialer also connects to a three-way conference with the user-requested contact. The process then ends, as illustrated in step 526.

Returning to connector B and referring to FIG. 5D, if the conference dialer application receives a third voice input (e.g., user states "forward the meeting information to John") from the user (step 528), the conference dialer application sends the meeting notification, along with the contact information with the user-requested contact to a communications application such as an SMS application, e-mail application, and the like in order to forward the meeting notification to the user-requested contact. The communications application then forwards the meeting notification to the user-requested contact (step 530). The process then ends, as illustrated in step 532.

Returning to connector B and referring to FIG. 5E, if the conference dialer application receives a fourth voice input (e.g., user states "delay connection to the meeting for five minutes") from the user (step 534), the conference dialer application will delay connection to the conference system for a predetermined time period (step 536). After expiration of the predetermined time period, the process returns to connector A (FIG. 5A) and then proceeds again to step 504, as described above.

Returning to connector B and referring to FIG. 5F, if the conference dialer application receives a fifth voice input (e.g., user states "cancel meeting") from the user (step 540), the conference dialer application will cancel access to the conference system (step 542). The process then ends, as illustrated in step 544.

Returning to step 512 and FIG. 5B, if the conference dialer application determines that the user equipment is set to a "silent" mode, the process continues to step 514. Step 514 illustrates the conference dialer application displaying a user interface (e.g., menu screen 410 of FIG. 4) prompting a user for silent input, in response to the meeting notification. The process then proceeds to connector C. If the conference dialer application, via the user interface, receives a first silent input (e.g., user selects option 1 on menu screen 410 of FIG. 4) from the user indicating to the UE to join a meeting on the conference system (step 516), the conference dialer application automatically supplies at least one conference code from the meeting notification to a telephone dialer application (e.g., telephone dialer application 312 of FIG. 3A) in order to join the meeting. The telephone dialer application supplies the conference system phone number and/or conference system passcode to a conference system manager (e.g., conference system manager 328 of FIG. 3B) without user interaction. The conference system manager assigns the user equipment to a virtual meeting (e.g., meeting 332a-332n) corresponding to the received conference system passcode and connects the user equipment to the meeting (step 519). The process then ends, as illustrated in step 520.

Returning to connector C and referring to FIG. 5G, if the conference dialer application receives a second silent input (e.g., user selects option 2 on menu screen 410 of FIG. 4 and specifies a user-requested contact) from the user (step 546), the conference dialer application connects a three-way conference with a user-requested contact and also connects to the meeting on the conference system (step 548). According to an embodiment of the present invention, the conference dialer application automatically supplies at least one conference code from the meeting notification to a telephone dialer application (e.g., telephone dialer application 312 of FIG. 3A) in order to join the meeting. The conference dialer application also supplies the contact information for the user-requested contact to the telephone dialer application in order to connect to a three-way conference with the user-requested contact. The at least one conference code can be a conference system phone number and/or conference system passcode included in the meeting notification. The telephone dialer application supplies the conference system phone number and/or conference system passcode to a conference system manager (e.g., conference system manager 328 of FIG. 3B) without user interaction. The conference system manager assigns the user equipment to a virtual meeting (e.g., meeting 332a-332n) corresponding to the received conference system passcode and connects the user equipment to the meeting. The telephone dialer also connects to a three-way conference with the user-requested contact (step 548). The process then ends, as illustrated in step 550.

Returning to connector C and referring to FIG. 5H, if the conference dialer application receives a third silent input (e.g., user selection option 3 on menu screen 410 of FIG. 4) from the user (step 552), the conference dialer application sends the meeting notification, along with the contact information with the user-requested contact to a communications application such as an SMS application, e-mail application, and the like in order to forward the meeting notification to the user-requested contact. The communications application then forwards the meeting notification to the user-requested contact (step 554). The process then ends, as illustrated in step 556.

Returning to connector C and referring to FIG. 5I, if the conference dialer application receives a fourth voice input (e.g., user selects option 4 on menu screen 410 of FIG. 4) from the user (step 558), the conference dialer application will delay connection to the conference system for a predetermined time period (step 560). After expiration of the predetermined time period, the process returns to connector A (FIG. 5A) and proceeds again to step 504, as described above.

Returning to connector C and referring to FIG. 5J, if the conference dialer application receives a fifth silent input (e.g., user selects option 5 on menu screen 410 of FIG. 4) from the user (step 564), the conference dialer application will cancel access to the conference system (step 566). The process then ends, as illustrated in step 568.

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

What is claimed:

1. A user equipment (UE), comprising:
at least one processor;
a non-transitory computer-readable storage medium, coupled to the at least one processor, the non-transitory computer-readable storage medium further includes computer-readable instructions, when executed by the at least one processor, are configured to:
  receive a meeting notification from a calendar application, wherein the meeting notification describes a meeting hosted on a conference system,
  determine if the UE is set to a silent mode,
  responsive to a determination that the UE is set to the silent mode, display a user interface prompt for a silent input in response to the meeting notification,
  receive a first silent input indicating to the UE to join a meeting on the conference system,
  responsive to the first silent input, automatically supply at least one conference access code to the conference system in order to join the meeting,
  responsive to a determination that the UE is not set to the silent mode, present a prompt for voice input in response to the meeting notification,
  receive a first voice input indicating to the UE to join the meeting on the conference system,
  responsive to the first voice input, automatically supply the at least one conference access code to the conference system in order to join the meeting, and
  connect to the meeting on the conference system.

2. The UE according to claim 1, wherein the computer-readable instructions, when executed by the at least one processor, are further configured to:
responsive to a second voice input, connect a three-way conference with a user-requested contact and the conference system.

3. The UE according to claim 1, wherein the computer-readable instructions, when executed by the at least one processor, are further configured to:
responsive to a third voice input, forward the meeting notification to at least one user-requested contact.

4. The UE according to claim 1, wherein the computer-readable instructions, when executed by the at least one processor, are further configured to:
responsive to a fourth voice input, delay access to the conference system for a predetermined time period.

5. The UE according to claim 1, wherein the computer-readable instructions, when executed by the at least one processor, are further configured to:
responsive to a fifth voice input, cancel access to the conference system.

6. A method for connecting a user equipment (UE) to a conference system, the method comprising:
receiving, using at least one processor, a meeting notification from a calendar application, wherein the meeting notification describes a meeting hosted on a conference system;
determining if the UE is set to a silent mode;
in response to determining that the UE is set to the silent mode, displaying a user interface prompt a silent input in response to the meeting notification;
receiving a first silent input indicating to the UE to join a meeting on the conference system;

in response to the first silent input, automatically supplying at least one conference access code to the conference system in order to join the meeting;

in response to determining that the US is not set to the silent mode, prompting for voice input in response to the meeting notification;

receiving a first voice input indicating to the UE to join the meeting on the conference system;

responsive to the first voice input, automatically supplying the at least one conference access code in order to join the meeting; and connecting to the meeting on the conference system.

7. The method of claim 6, further comprising:

in response to a second voice input, connecting a three-way conference with a user-requested contact and the conference system.

8. The method of claim 6, further comprising:

in response to a third voice input, forwarding the meeting notification to at least one user-requested contact.

9. The method of claim 6, further comprising:

in response to a fourth voice input, delaying access to the conference system for a predetermined time period.

10. The method of claim 6, further comprising:

in response to a fifth voice input, cancel access to the conference system.

11. A non-transitory computer-readable storage medium further including computer-readable instructions, when executed by at least one processor, are configured to:

receive a meeting notification from a calendar application, wherein the meeting notification describes a meeting hosted on a conference system;

determine if the UE is set to a silent mode;

responsive to a determination that the UE is set to the silent mode, display a user interface prompt for a silent input in response to the meeting notification;

receive a first silent input from the user indicating to the UE to join the meeting on the conference system;

responsive to the first silent input, automatically supply at least one conference access code to the conference system in order to join the meeting;

responsive to a determination that the UE is not set to the silent mode, present a prompt for voice input in response to the meeting notification;

receive a first voice input from the user indicating to the UE to join the meeting on the conference system;

responsive to the first voice input, automatically supply the at least one conference access code to the conference system in order to join the meeting; and connect to the meeting on the conference system.

12. The non-transitory computer-readable storage medium of claim 11, wherein the computer-readable instructions, when executed by the at least one processor, are further configured to:

responsive to a second voice input, connect a three-way conference with a user-requested contact and the conference system.

13. The non-transitory computer-readable storage medium of claim 11, wherein the computer-readable instructions, when executed by the at least one processor, are further configured to:

responsive to a third voice input, forward the meeting notification to at least one user-requested contact.

14. The non-transitory computer-readable storage medium of claim 11, wherein the computer-readable instructions, when executed by the at least one processor, are further configured to:

responsive to a fourth voice input, delay access to the conference system for a predetermined time period.

15. The non-transitory computer-readable storage medium of claim 11, wherein the computer-readable instructions, when executed by the at least one processor, are further configured to:

responsive to a fifth voice input, cancel access to the conference system.

16. A system for connecting a user equipment (UE) to a conference system, the system comprising:

a user equipment (UE), further comprising:

at least one processor;

a non-transitory computer-readable storage medium, coupled to the at least one processor, the non-transitory computer-readable storage medium further includes computer-readable instructions, when executed by the at least one processor, are configured to:

receive a meeting notification from a calendar application, wherein the meeting notification describes a meeting hosted on a conference system, determine if the UE is set to a silent mode, responsive to a determination that the UE is set to the silent mode, display a user interface prompt for a silent input in response to the meeting notification, receive a first silent input indicating to the UE to join a meeting on the conference system, responsive to the first silent input, automatically supply at least one conference access code to the conference system in order to join the meeting, responsive to a determination that the UE is not set to the silent mode, present a prompt for voice input in response to the meeting notification, receive a first voice input indicating to the UE to join the meeting on the conference system; and responsive to the first voice input, automatically supply the at least one conference access code to the conference system in order to join the meeting, and connect to the meeting on the conference system; and a conference system, further comprising:

at least one processor;

a non-transitory computer-readable storage medium, coupled to the at least one processor, wherein the non-transitory computer-readable storage medium further includes computer-readable instructions, when executed by the at least one processor, are configured to:

receive the at least one conference access code from the UE, assign the UE to a virtual meeting corresponding to the at least one conference access code, and connect the UE to the virtual meeting.

17. The system according to claim 16, wherein the computer-readable instructions in the UE, when executed by the at least one processor, are further configured to:

responsive to a second voice input, connect a three-way conference with a user-requested contact and the conference system.

18. The system according to claim 16, wherein the computer-readable instructions in the UE, when executed by the at least one processor, are further configured to:

responsive to a third voice input, forward the meeting notification to at least one user-requested contact.

19. The system according to claim 16, wherein the computer-readable instructions in the UE, when executed by the at least one processor, are further configured to:

responsive to a fourth voice input, delay access to the conference system for a predetermined time period.

20. The UE according to claim 16, wherein the computer-readable instructions in the UE, when executed by the at least one processor, are further configured to:

responsive to a fifth voice input, cancel access to the conference system.

\* \* \* \* \*

UNITED STATES PATENT AND TRADEMARK OFFICE
CERTIFICATE OF CORRECTION

PATENT NO. : 9,210,267 B2
APPLICATION NO. : 14/568735
DATED : December 8, 2015
INVENTOR(S) : Bennett, Jr.

It is certified that error appears in the above-identified patent and that said Letters Patent is hereby corrected as shown below:

In the specification,

In Column 1, Line 7, delete "2012." and insert -- 2012, now Pat. No. 8,914,006. --, therefor.

In Column 3, Line 36, delete "DRAWING" and insert -- DRAWINGS --, therefor.

In Column 3, Line 58, delete "is a depicts" and insert -- depicts --, therefor.

In Column 3, Line 60, delete "FIG." and insert -- FIGS. --, therefor.

In Column 4, Line 67, delete "(RAM)" and insert -- (ROM) --, therefor.

In Column 5, Line 35, delete "(RAM)" and insert -- (ROM) --, therefor.

In Column 8, Line 30, delete "is a depicts" and insert -- depicts --, therefor.

In Column 8, Line 58, delete "FIG." and insert -- FIGS. --, therefor.

In Column 8, Line 59, delete "FIG." and insert -- FIGS. --, therefor.

In Column 9, Line 2, delete "FIG." and insert -- FIGS. --, therefor.

In Column 9, Line 33, delete "a "audible"" and insert -- an "audible" --, therefor.

In the claims,

In Column 15, Line 3, in Claim 20, delete "The UE according to claim" and insert -- The system according to claim --, therefor.

Signed and Sealed this
Twenty-ninth Day of March, 2016

Michelle K. Lee
*Director of the United States Patent and Trademark Office*